US009684579B1

(12) United States Patent
Adams et al.

(10) Patent No.: US 9,684,579 B1
(45) Date of Patent: Jun. 20, 2017

(54) TEST DEVICE SELECTION USING MULTI-PASS SCORING

(71) Applicant: Amazon Technologies, Inc., Seattle, WA (US)

(72) Inventors: Zoe Adams, Mission Viejo, CA (US); Jordan Petrov Marinov, Corona, CA (US); Chaitanya Avinash Ganoo, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 147 days.

(21) Appl. No.: 14/562,343

(22) Filed: Dec. 5, 2014

(51) Int. Cl.
*G06F 11/00* (2006.01)
*G06F 11/26* (2006.01)

(52) U.S. Cl.
CPC .................. *G06F 11/261* (2013.01)

(58) Field of Classification Search
USPC .......................................................... 714/25
See application file for complete search history.

(56) References Cited

U.S. PATENT DOCUMENTS

| | | | | |
|---|---|---|---|---|
| 4,802,164 A * | 1/1989 | Fukuoka | ............. | G06F 11/2736 714/44 |
| 6,122,664 A * | 9/2000 | Boukobza | ........... | G06F 11/0709 345/418 |
| 6,542,411 B2 * | 4/2003 | Tanikawa | ............... | G11C 16/30 365/185.28 |
| 6,697,753 B2 * | 2/2004 | Samuelson | ........ | G01R 31/2841 324/76.11 |
| 7,356,631 B2 * | 4/2008 | Lin | ...................... | G06F 13/1642 710/240 |
| 7,809,369 B2 * | 10/2010 | Parmar | ................. | H04W 24/06 370/241 |
| 7,948,254 B2 * | 5/2011 | Olgaard | .................... | H04L 1/06 324/756.05 |
| 8,250,003 B2 * | 8/2012 | Candela | ............... | G06N 99/005 706/12 |
| 8,307,342 B2 * | 11/2012 | Oglesby | .............. | G06F 11/3684 717/124 |
| 8,535,720 B2 * | 9/2013 | Shekunov | .............. | A61K 9/146 264/5 |
| 8,997,061 B1 * | 3/2015 | Davison | .............. | G06F 11/3688 717/124 |
| 9,304,894 B2 * | 4/2016 | Fishaimer | ........... | G06F 11/3668 |
| 9,529,701 B2 * | 12/2016 | Ekambaram | ........ | G06F 11/3664 |
| 2003/0078747 A1 * | 4/2003 | Sutton | ...................... | G01R 1/02 702/67 |

(Continued)

*Primary Examiner* — Amine Riad
(74) *Attorney, Agent, or Firm* — Klarquist Sparkman, LLP

(57) ABSTRACT

A method for selecting test devices in a service provider environment may include receiving a request for performing a test on a device, the request specifying at least one parameter for the test. A list of available devices may be obtained. The list of available devices may be filtered to generate a list of candidate hardware devices that meet the at least one parameter for the test. Using a first set of operations, current state information for each of the candidate devices may be obtained. Using a second set of operations, at least one weight may be assigned to the current state information to generate weighted state information for each of the candidate devices. Device scores may be generated using the weighted state information. Based on the scores, one of the candidate devices may be selected for performing the test.

20 Claims, 9 Drawing Sheets

(56) References Cited

U.S. PATENT DOCUMENTS

| | | | |
|---|---|---|---|
| 2007/0027968 A1* | 2/2007 | Price | H04L 12/2697 709/220 |
| 2008/0189580 A1* | 8/2008 | Kim | H04L 12/2697 714/712 |
| 2008/0195387 A1* | 8/2008 | Zigel | G10L 17/06 704/236 |
| 2012/0206557 A1* | 8/2012 | Ridges | H04N 21/41407 348/14.02 |
| 2013/0006567 A1* | 1/2013 | Horn | G01R 31/31907 702/108 |
| 2013/0283099 A1* | 10/2013 | Huang | G06F 11/2294 714/32 |
| 2014/0064149 A1* | 3/2014 | Frey | H04L 41/0869 370/255 |
| 2014/0218063 A1* | 8/2014 | Roberts, Jr. | G01R 31/2893 324/756.02 |
| 2014/0250331 A1* | 9/2014 | McCoy | G06F 11/261 714/37 |
| 2015/0142872 A1* | 5/2015 | Polishchuk | G06Q 30/0242 709/203 |
| 2015/0244477 A1* | 8/2015 | Hirst | H04B 17/15 455/67.14 |
| 2015/0356462 A1* | 12/2015 | Fawaz | G06N 99/005 706/12 |
| 2016/0232069 A1* | 8/2016 | Thornley | G06F 11/00 |

* cited by examiner

FIG. 3

| Criteria | Weight |
|---|---|
| Device State | 1000 |
| Pending Tasks | 500 |
| Like_Idle | 100 |
| Like_Total | 50 |
| Last test time | 10 |

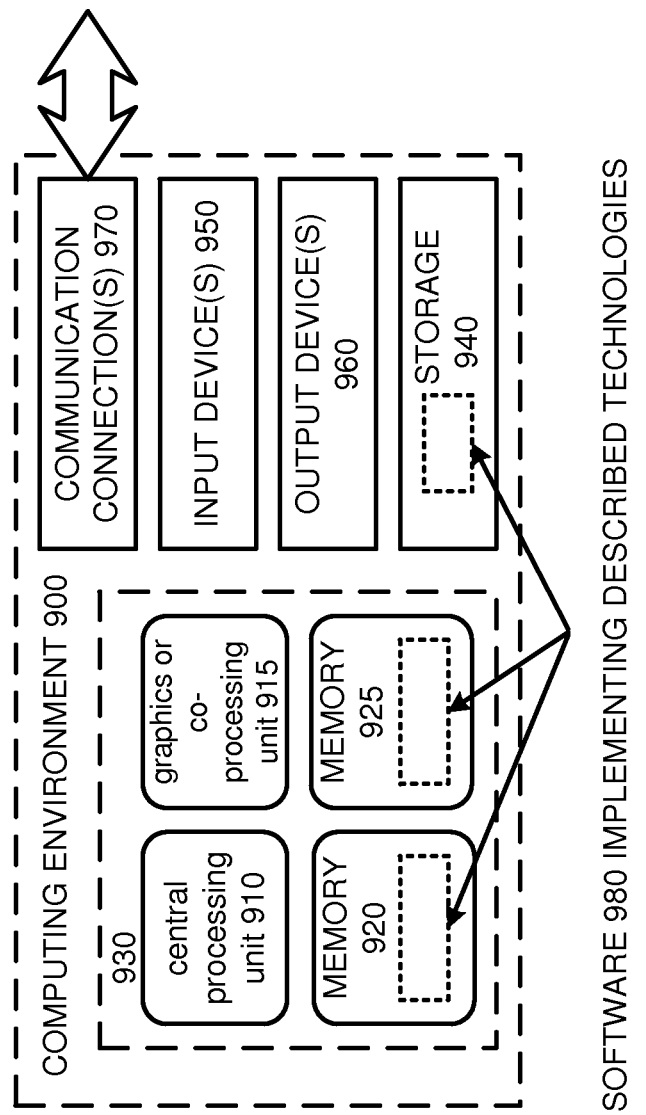

TEST DEVICE SELECTION USING MULTI-PASS SCORING

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs. Additionally, efficient use of the computing resources may require frequent execution of testing routines to test various applications on one or more hardware configurations. However, each testing routine may need to run on hardware with a specific attribute set, which may be time consuming to schedule.

BRIEF DESCRIPTION OF THE DRAWINGS

Various embodiments in accordance with the present disclosure will be described with reference to the drawings, in which:

FIG. 3 is an example weighting table which may be used for test scheduling, in accordance with an embodiment of the disclosure.

FIG. 9 depicts a generalized example of a suitable computing environment in which the described innovations may be implemented.

DETAILED DESCRIPTION

The following description is directed to techniques and solutions supporting test hardware selection using multi-pass scoring. A test scheduling service may be used to receive test submissions, which identify one or more attributes of a testing device (e.g., hardware device or an emulated device) to perform the test. A pool of available testing devices may be initially screened based on the attributes identified by the received test to obtain a list of candidate hardware devices. The test scheduling service may then use multi-pass scoring to rank the candidate hardware devices and select a device to receive the test based on the ranking. More specifically, during a first processing pass associated with a first set of operations, current state information for each of the candidate hardware devices may be determined. During a second processing pass associated with a second set of operations, the test scheduling service may assign at least one weight to the current state information to generate weighted state information for each of the candidate hardware devices. A score may then be calculated for each candidate device, and a selection of a test device may be performed based on the scores. The test as well as information identifying the selected device may be submitted to a queuing server for queuing the test in a test thread (i.e., activity queue) for execution by the selected device.

Figure 1:
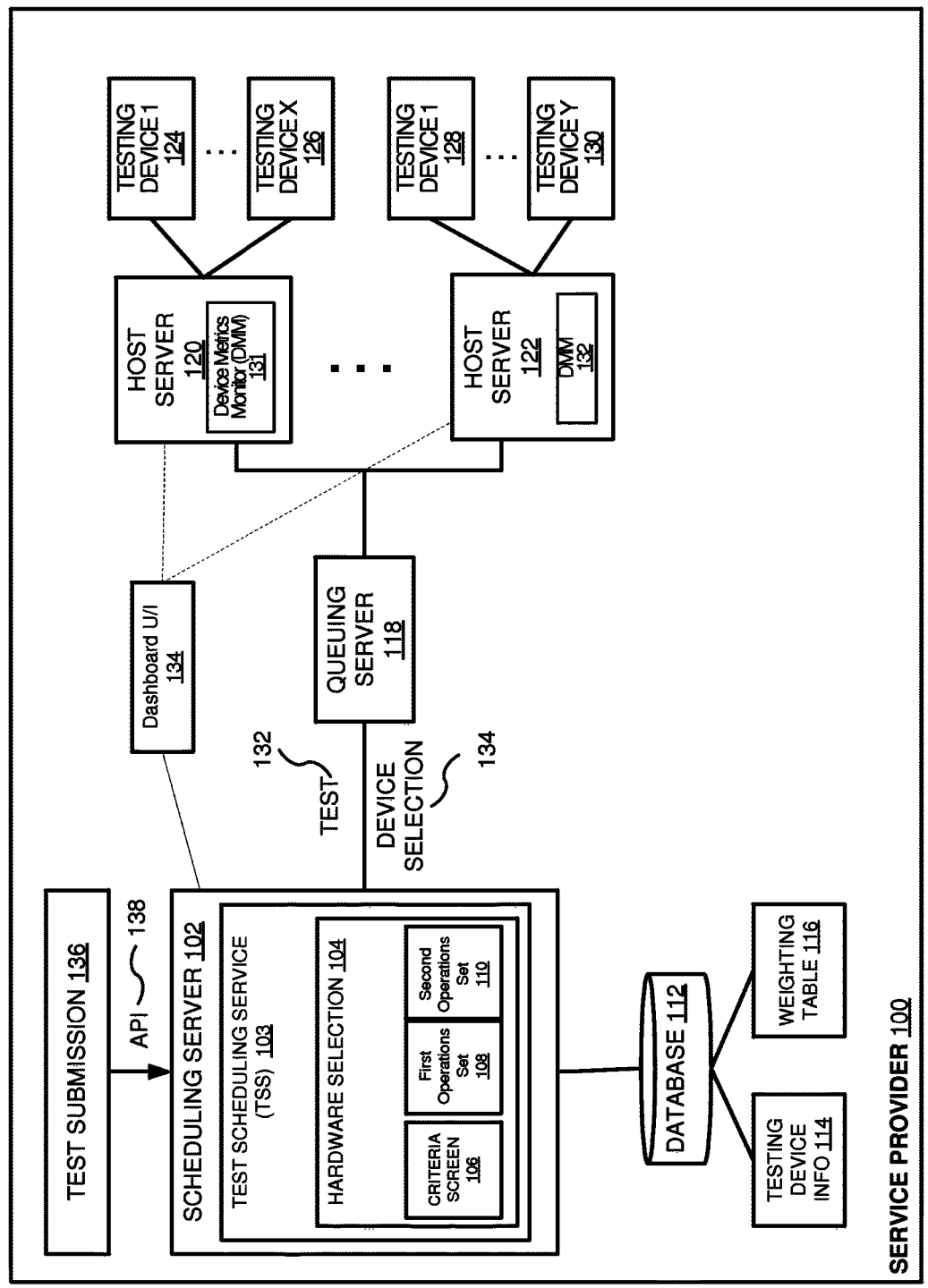
FIG. 1 is a diagram of an example network environment supporting using a test scheduling service for implementing test scheduling based on multi-pass scoring, in accordance with an embodiment of the disclosure.

FIG. 1 is a diagram of an example network environment supporting using a test scheduling service for implementing test scheduling based on multi-pass scoring, in accordance with an embodiment of the disclosure. Referring to FIG. 1, the illustrated network environment may comprise a service provider 100. The service provider 100 may be, for example, a cloud provider that is capable of delivery of computing and storage capacity as example services to a community of end recipients (e.g., tenants or customers). The service provider 100 may comprise a test scheduling service (TSS) 103, a database 112, a queuing server 118, and a plurality of server computers 120, . . . , 122. A plurality of testing hardware devices may be attached to each of the servers 120, . . . , 122. For example, testing devices 124, . . . , 126 may be attached to server 120 and testing devices 128, . . . , 130 may be attached to server 122. The testing devices may have different device attributes, such as device build type, device battery life, device operating system revision number, device rooted state, device product code, device operating status, and/or time of last conducted device test. A list of the available testing devices 124, . . . 130 with the corresponding attributes for each device may be stored as testing device information 114 within the database 112. In an example embodiment, the test devices 124, . . . , 130 may include emulated devices (e.g., emulated on a virtual machine instance running on the corresponding host server, such as one or more of the instances 406 illustrated in FIG. 4).

The TSS 103 may comprise suitable logic, circuitry, interfaces, and/or code and may be operable to perform test scheduling functionalities in connection with a received test (e.g., 136). The TSS 103 may be implemented as part of a scheduling server 102 within the service provider 100. Additionally, the TSS 103 may use a hardware selection module 104 (which may be implemented in hardware and/or software) to rank and select one of the available test hardware devices 124, . . . , 130 to perform the received test 136. More specifically, the hardware selection module 104 may comprise criteria screen block 106 as well as first and second set of operations 108 and 110, respectively. The criteria screen block 106 may comprise suitable logic, circuitry, interfaces, and/or code and may be operable to perform initial filtering of the available hardware devices based on input criteria (e.g., hardware attributes for a desired test device) received as part of the submitted test 136. In this regard, the criteria screen block 106 filters the available devices (e.g., devices 124, . . . , 130 as specified/identified by the testing device information 114) to generate a list of candidate hardware devices. The generated list of candidate hardware devices is then processed using the multi-pass scoring performed by the first and second set of operations 108, 110 (using, e.g., the weighting table 116 stored in database 112) to generate a final test device selection (e.g., 134) to perform the received test 136. A more detailed description of the multi-pass scoring techniques is provided herein below in reference to FIG. 2.

The service provider environment 100 may further comprise a test submission block 136, which may be implemented within one or more separate servers. The test submission block 136 may communicate (e.g., via an application programming interface, or API, 138) the test 136 to the scheduling server 102 for scheduling by the TSS 103. The test 136 may include various test applications or other routines for testing on one of the devices 124, . . . , 130. Additionally, the test 136 may specify one or more device attributes (or input criteria) for a type of testing device to be used to perform the test. The specified device attributes may be used (as described herein below) to screen (or filter) a pool of available testing devices. In an example embodiment, the device attributes information may be stored in an attribute signature, which may be a device hash key (e.g., 203) built from relevant device information, such as the desired device attributes (e.g., operating system build and revision number, screen resolution, memory capacity, Wi-Fi enabled status, and so forth).

Figure 2:
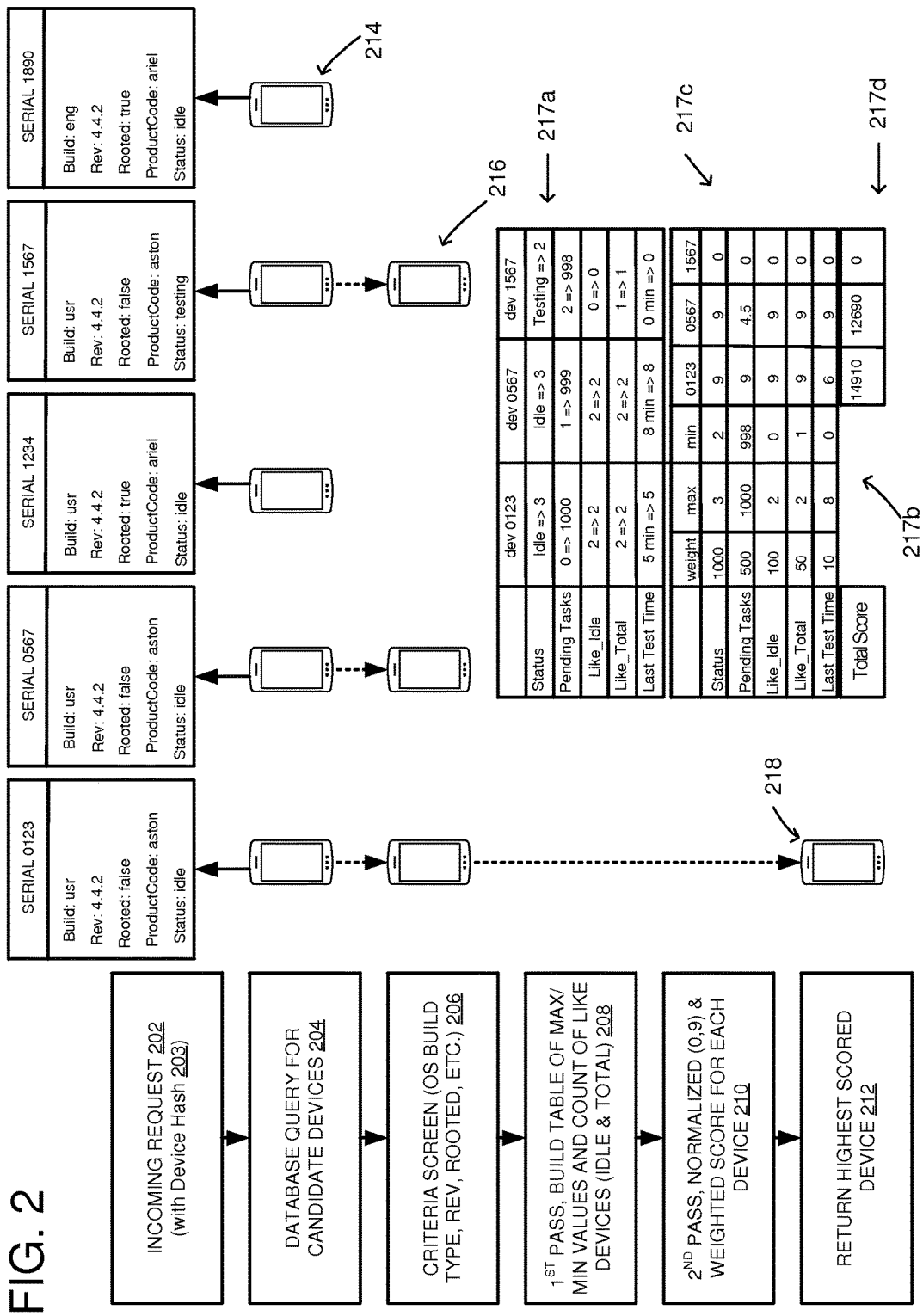
FIG. 2 is a diagram of an example selection of a test device using a test scheduling service for implementing test scheduling based on multi-pass scoring, in accordance with an embodiment of the disclosure.

FIG. 2 is a diagram of an example selection of a test device using a test scheduling service for implementing test scheduling based on multi-pass scoring, in accordance with an embodiment of the disclosure. In operation and in reference to FIGS. 1-2, an incoming test request 202 (with a device hash 203) may be sent from the test submission block 136 via the API 138. The TSS 103 may receive the request and at 204, may query the database 112 for a list of available testing devices (e.g., specified by the testing device information 114). For example, the testing device information 114 may return the available devices 214 serial numbers, e.g., 0123, 0567, 1234, 1567, and 1890. The testing device information 114 may further specify (for each of the five available devices 214), a device build (e.g., a user device for use by a user or an engineer device for use by a device engineer), an operating system revision number, device rooted status (i.e., whether the device is rooted or not), a device product code (i.e., a text string or code word identifying the device model), and device status (i.e., whether the device is idle, testing or offline). The TSS 103 may then use the hardware selection block 104 to perform multi-pass scoring to select a testing device from the pool of available devices 214.

As used herein, the term "multi-pass scoring" refers to a plurality of processing stages (or "passes") that may be performed by the hardware selection block 104 within the TSS 103 using a separate set of operations for each processing pass. For example, at 206, the TSS 103 may apply a criteria screen 106 to filter the initial list of five available devices retrieved from the database 112. For example, the input criteria (or device hash) 203 may specify that the received test 136 is to be performed on a non-rooted device with a product code of "aston". Therefore, during the criteria screen 206, the TSS 103 may select devices with serial numbers 0123, 0567, and 1567 as a list 216 of candidate testing devices for making a final device selection.

The candidate testing device list 216 may then be processed in one or more subsequent "passes" to make the final device determination. More specifically, at 208 and during a first set of operations 108, the TSS 103 may obtain state information for the candidate testing device 216. For example, table 217a illustrates state information for the three candidate hardware devices 216. For each device, table 217a includes numeric value for device status, pending tasks, Like_Idle devices, Like_Total devices and last test time. Device status can be idle, testing or offline, and a corresponding numeric value for each status may be 3, 2, and 0, respectively. In this regard, a higher numeric value (and therefore higher score) is given to idle devices, and a lower value (e.g., 2 or 0) is given to devices that are currently testing (and busy) or offline (and unavailable).

The pending task state information illustrated in table 217a lists pending tasks of 0, 1, and 2 for the three candidate devices. Since 0 pending tasks (i.e., the device is currently available for executing a test) is more desirable than 1 or 2 pending tasks, the numeric values for this state information category may be obtained by subtracting the actual number of pending tasks from a fixed number (e.g., 1000). In the specific example of table 217a, pending tasks of 0, 1, and 2 translate to a numeric value of 1000 (i.e., 1000-0), 999 (i.e., 1000-1) and 998 (i.e., 1000-2), respectively. In this regard, the device with 0 pending tasks will have a higher score than a device with 1 or more pending tasks.

Like_Idle device count may indicate a count of "like" devices (e.g., devices that have the same hardware signature, such as a device hash, as the current device) that are currently idle. Like_Total device count indicates a total count of "like" devices. For example, for device serial number 0123, there are 2 Like_Idle device (i.e., the device itself, 0123, and 0567; note device 1567 is not idle and cannot be included in this count). Similarly, Like_Total count is also 2 (devices 0123 and 0567). In comparison, the Like_Idle count for device 1567 is 0 since devices 0123 and 0567 are different from device 1567, and 1567 is not idle. The Like_Total count for device 1567 is 1 since device 1567 is the only one in the candidate list 216 with its device attributes.

The last test time parameter may indicate the number of minutes since the last test was performed on the selected device. As seen in table 217a, the last test time value for the three candidate devices is 5, 8 and 0, respectively (note that value 0 for device 1567 indicates that the device is currently testing).

After numeric values for the state information is determined, maximum and minimum values for the state information in table 217a may be posted in table 217b as part of the first set of operations 108. For example, the status numeric values range from 3 (maximum) to 2 (minimum); the pending tasks value ranges from 1000 (maximum) to 998 (minimum); Like_Idle ranges from 2 (maximum) to 0 (minimum); Like_Total ranges from 2 (maximum) to 1 (minimum); and last test time ranges from 8 (maximum) to 0 (minimum).

At 210, during the second set of operations 110, device score 217d may be generated for each of the candidate test devices 216. Initially, the TSS 103 may acquire weight values for each of type of status information. For example, the TSS 103 may acquire weighting table 116 from the database 112, which is illustrated in greater detail in FIG. 3. FIG. 3 is an example weighting table which may be used for test scheduling, in accordance with an embodiment of the disclosure. More specifically, weight values of 1000, 500, 100, 50, and 10 may be acquired from table 116 for the device status, the pending tasks status, the Like_Idle status, the Like_Total status, and the last test time status, respectively. The weight values are illustrated next to the "max" column in table 217b in FIG. 2. In an example embodiment, the weight for a given criteria may be selected to be larger than the normalization range (e.g., 0-9 normalization range for the example in FIG. 2), to ensure preference to that criteria. For example, the top four weights in the table in FIG. 3 are selected to be at least five times larger than the normalization range (e.g., 10). Additionally, weights may also be selected so that weight difference between various criteria is significant so that certain criteria dominate over one or more remaining criteria, regardless of the normalization range. In the example weights in FIG. 3, the device state is given the highest weight of 1000, which is 100 times higher than the weight 10 given to the last test time criteria (this ensures preferential selection based on device state versus last test time, for a given normalization range).

Additionally, during the second set of operations 110, the TSS 103 may normalize the maximum and minimum values in the table 217b, creating a new table 217c. More specifically, during normalization, the maximum and minimum values may be mapped to specific numeric values (e.g., each maximum value may be mapped to 9 and each minimum value may be mapped to 0). Corresponding values between the maximum and minimum values may be mapped to fall between the normalized range (e.g., between 0 and 9). As seen in table 217c, normalized values for the device status are 9 (normalized maximum value of 3), 9 (normalized maximum value of 3), and 0 (normalized minimum value of 2) for devices 0123, 0567, and 1567, respectively. For pending tasks status, the normalized values are 9 (corresponding to maximum value of 1000 for device 0123), 0 (corresponding to minimum value of 998 for device 1567) and 4.5 (between 0 and 9, and corresponding to value of 999 for device 0567). Similar normalized values are also determined and posted in table 217c for the remaining status information for each of the candidate test devices 216.

As part of the second set of operations 110, the TSS 103 may calculates scores 217d for each of the candidate test devices, by multiplying each of the normalized values for each device by the corresponding weight, and adding the weighted normalized values to get a final score. For example, for device 0123, the final score is (9×1000)+(9×500)+(9×100)+(9×50)+(6×10)=14910. Similarly, the final score for device 0567 may be calculated as 12690, and 0 for device 1567.

At 212, the TSS 103 may select device 0123 as the highest scoring device, and the device selection 134 (identifying device 0123) as well as the received test 136 may be communicated to the queuing server 118. The queuing server 118 may then queue the received test 136 in a device activity queue associated with the selected device. The queuing server 118 may also perform load-balancing function in connection with distribution of multiple test requests into corresponding activity queues for selected test devices. The queuing server determines (e.g., based on the device selection information 134) which host server from the available servers 120, . . . , 122 manages the selected test device, and forwards the received text 136 from an activity queue at the queuing server 118 to an activity queue for the selected device at the host server.

In accordance with an example embodiment of the disclosure, each of the host servers 120, . . . , 122 may also comprise a device metrics monitor (DMM) (e.g., 131, . . . , 132). The DMM may comprise suitable logic, circuitry, interfaces, and/or code and may be operable to monitor the testing devices attached to a host server, and generate one or more metric. Example metrics that can be generated by the DMMs include identification of connected test devices, device attributes (i.e., system characteristics), device status, device repair history, performed tests, prior test durations, current test status, and so forth. The metrics may be stored at each server or in a database (e.g., attached to each server or a network database, such as 420 in FIG. 4). The metrics may also be communicated back (e.g., periodically or in real-time) to the queuing server 118 and/or the TSS 103 for storage or processing. In example embodiment, the service provider 100 may also provide a dashboard user interface (U/I) 134, which may be used for managing the functionalities of the DMMs 131, . . . , 132 and displaying one or more of the metrics collected by the DMMs. The dashboard U/I 134 may be hosted by the scheduling server (e.g., as part of the TSS 103) or by any of the host servers 120, . . . , 122.

Figure 4:
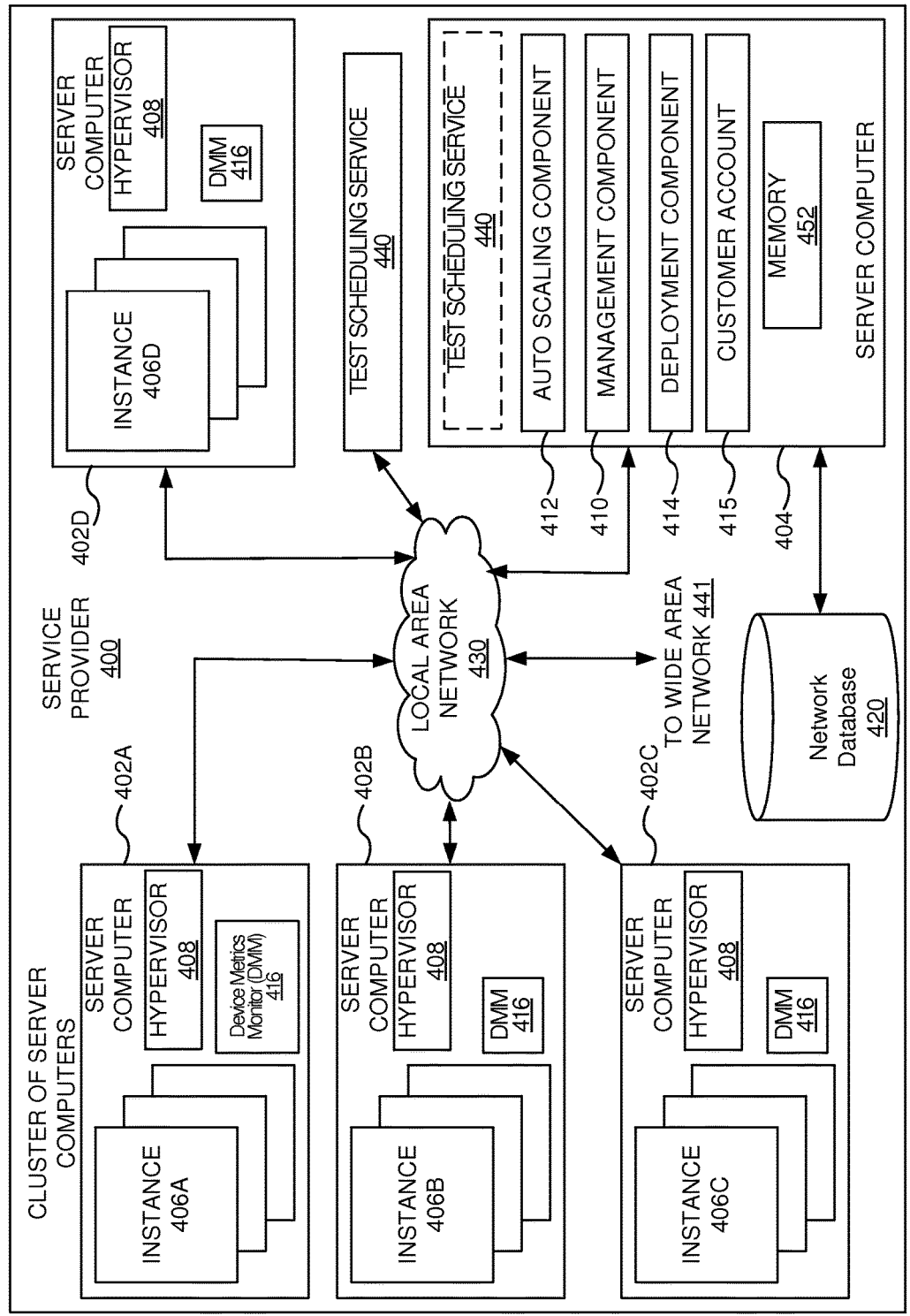
FIG. 4 is an example system diagram showing a plurality of virtual machine instances running in a multi-tenant environment, using a test scheduling service, in accordance with an example embodiment of the disclosure.

FIG. 4 is an example system diagram showing a plurality of virtual machine instances running in a multi-tenant environment, using a test scheduling service, in accordance with an example embodiment of the disclosure. More specifically, FIG. 4 is a computing system diagram of a network-based service provider 400 that illustrates one environment in which embodiments described herein can be used. By way of background, the service provider 400 (i.e., the cloud provider) is capable of delivery of computing and storage capacity as a service to a community of end recipients (e.g., tenants or customers). The service provider 400 may be the same as the service provider 100 illustrated in FIG. 1.

In an example embodiment, the service provider 400 can be established for an organization by or on behalf of the organization. That is, the service provider 400 may offer a "private cloud environment." In another embodiment, the service provider 400 supports a multi-tenant environment, wherein a plurality of customers operate independently (i.e., a public cloud environment). Generally speaking, the service provider 400 can provide the following models: Infrastructure as a Service ("IaaS"), Platform as a Service ("PaaS"), and/or Software as a Service ("SaaS"). Other models can be provided. For the IaaS model, the service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service provider platform without the cost of buying and managing the underlying hardware and software. The SaaS model allows installation and operation of application software in the service provider. In some embodiments, end users access the service provider 400 using networked customer devices, such as desktop computers, laptops, tablets, smartphones, etc. running web browsers or other lightweight customer applications. Those skilled in the art will recognize that the service provider 400 can be described as a "cloud" environment.

The particular illustrated service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications.

In an example embodiment, each of the server computers 402A-402D may also comprise a DMM module 416, which may perform functionalities similar to the DMMs 131, . . . , 132 discussed above in reference to FIG. 1.

The service provider 400 may also comprise a test scheduling service (TSS) 440, which may have the functionalities described herein in connection with the TSS 103 of FIGS. 1-3. The TSS 440 may be implemented as a stand-alone service within the provider 400, as a dedicated server (similar to the servers 402A-402D), and/or may be implemented as part of the server computer 404 that performs management functions. The TSS 440 may use a network database 420, which may include the functionalities of database 112 illustrated in FIG. 1. In an example embodiment, the TSS 440 may also run as a virtual machine instance (e.g., as one of the instances 406) on one of the host servers 402.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402, the instances 406, the hypervisors 408, and/or the endpoint selection service 440. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand.

The server computer 404 may further comprise memory 452, which may be used as processing memory by the endpoint selection service 440. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 441 so that end-users can access the service provider 400. It should be appreciated that the network topology illustrated in FIG. 4 has been simplified and that many more networks and networking devices can be utilized to interconnect the various computing systems disclosed herein.

Figure 5:
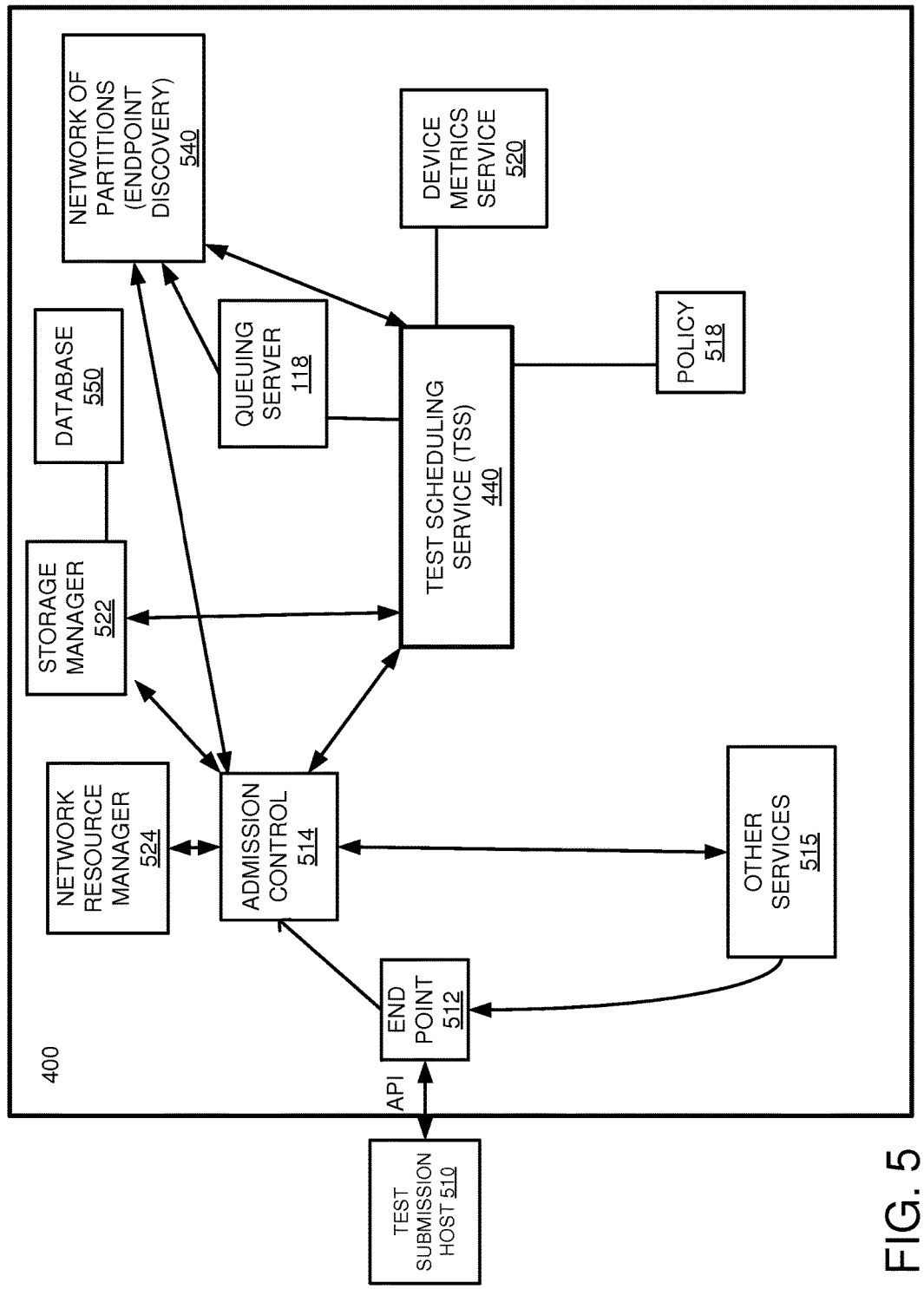
FIG. 5 shows further details of an example system including a plurality of management components associated with a control plane, which may be used to provide network security policy implementation according to one embodiment.

FIG. 5 shows further details of an example system including a plurality of management components associated with a control plane, which may be used to provide network security policy implementation according to one embodiment. More specifically, FIG. 5 illustrates in further detail the service provider environment 400, which may implement the test scheduling service 440.

In order to access and utilize the TSS 440, the test submission host 510 may communicate/submit a test (e.g., 136) to the end point 512. The test submission host 510 can be any of a variety of computing devices, mobile or otherwise, including a cell phone, smartphone, handheld computer, Personal Digital Assistant (PDA), desktop computer, etc. The test submission host 510 can communicate with the service provider 400 through an end point 512, which can be a DNS address designed to receive and process application programming interface (API) requests (e.g., request 138). In particular, the end point 512 can be a web server configured to expose an API. Using the API requests, the test submission host 510 can submit a test (e.g., 136) and make requests to implement any of the functionality described herein or to access one or more services provided by the service provider 400 (e.g., the TSS 440). Other services 515, which can be internal to the service provider 400, can likewise make API requests to the end point 512. The API requests from the host 510 can pass through the admission control 514 and onto the test scheduling service 440 in order to access test scheduling functionalities of the service provider 400.

Other general management services that may or may not be included in the service provider 400 (and/or within the management component 410) include an admission control 514, e.g., one or more computers operating together as an admission control web service. The admission control 514 can authenticate, validate and unpack the API requests for service or storage of data within the service provider 400. The storage manager 522 relates to initiation and termination of storage volumes, while the network resource manager 524 relates to initiation and termination of routers, switches, subnets, etc. A database 550 may be coupled to (and managed by) the storage manager 522. The database 550 may be similar in functionality to the database 112 and/or 420. A network of partitions 540 is described further in relation to FIG. 6, and includes a physical layer upon which instances and/or device activity queues are launched.

The test scheduling service 440 may perform the test scheduling functionalities described herein (e.g., the functionalities described in reference to FIGS. 1-3). The TSS 440 may communicate with the admission control 514 (e.g., to receive new API service requests and test submissions, such as test 136) and with the network of partitions 540 (to select one or more test devices coupled to a host server). The TSS 440 may communicate directly with the network of partitions 540 and/or via the queuing server 118 (e.g., to use load balancing functionalities provided by the queuing server 118). The TSS 440 may also use a device metrics service 520, which may comprise suitable logic, circuitry, interfaces, and/or code and may be operable to process device metrics information (e.g., device metrics for one or more of the testing devices 124, . . . , 130, as reported by the DMMs 131, . . . , 132. Additionally, the TSS 440 may use a policy document 518, which may be used (e.g., by an administrator within the service provider environment 400) to specify one or more parameters of the TSS 440 (e.g., weight values within the weighting table 116, device status information which may be used in calculating the device scores, normalization value ranges, and so forth).

Figure 6:
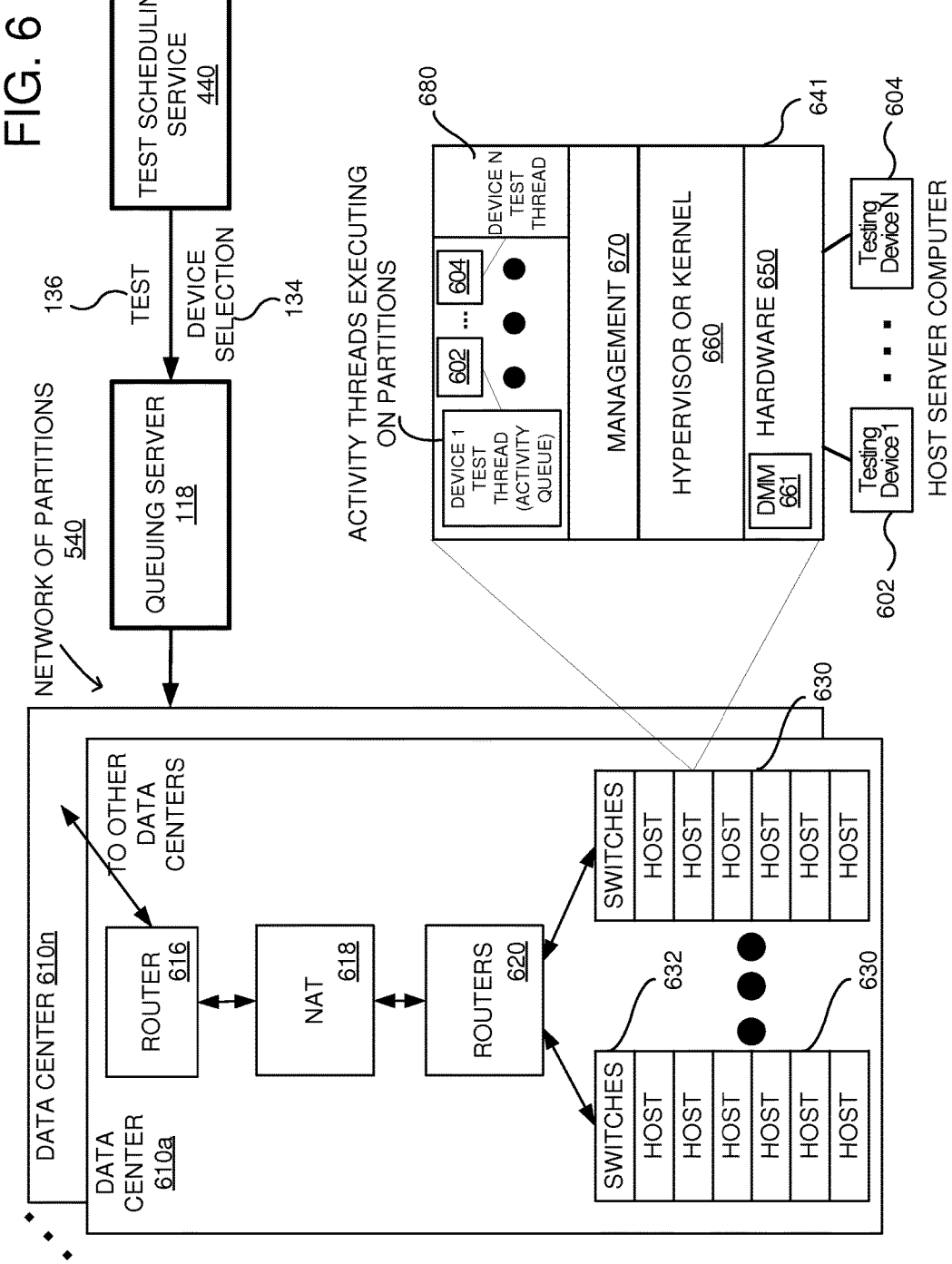
FIG. 6 shows an example of a plurality of host computers, routers, and switches—which are hardware assets used for device running activity queues—with the host computers having test scheduling-related functionalities that may be configured according to one embodiment.

FIG. 6 shows an example of a plurality of host computers, routers, and switches—which are hardware assets used for device running activity queues—with the host computers having test scheduling-related functionalities that may be configured according to one embodiment. More specifically, FIG. 6 illustrates the network of partitions 540 and the physical hardware associated therewith. The network of partitions 540 can include a plurality of data centers, such as data centers 610*a*, . . . , 610*n*, coupled together by routers, such as router 616.

The router 616 reads address information in a received packet and determines the packet's destination. If the router decides that a different data center contains a host server computer, then the packet is forwarded to that data center. If the packet is addressed to a host in the data center 610*a*, then it is passed to a network address translator (NAT) 618 that converts the packet's public IP address to a private IP address. The NAT 618 also translates private addresses to public addresses that are bound outside of the data center 610*a*. Additional routers 620 can be coupled to the NAT 618 to route packets to one or more racks 630 of host server computers. Each rack 630 can include a switch 632 coupled to multiple host server computers. A particular host server computer is shown in an expanded view at 641.

Each host 641 has underlying hardware 650. The hardware layer 650 may include a DMM module 661 for performing the device monitoring functionalities as performed by DMMs 131, . . . , 132 (FIG. 1). Additionally, the hardware 650 can include a plurality of testing devices 602, . . . , 604, which may be used to run tests (e.g., a test 136 and a device selection 134) may be received from the TSS 440 via the queuing server 118. The device selection 134 may select one of the devices (e.g., 602) attached to server 641. The test 136 may then be forward to the activity queue for device 602, and communicated in order to device 602 for implementing the test. Test results may be communicated back to the DMM 661 and/or the device metrics service 520 for storage and/or reporting. In an example embodiment, the devices 602, . . . , 604 may be emulated devices, which may be running on virtual machine instances on the partitions 680.

Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used.

A management layer 670 can be part of the hypervisor or separated therefrom, and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can be used to run device test threads (or activity queues) for queuing tests to be performed by one or more of the test devices 602, . . . , 604 attached to the host 641. As such, each partition 680 is an abstract portion of capacity designed to support its own activity queue (e.g., as part of a virtual machine) independent of the other partitions.

Figure 7:
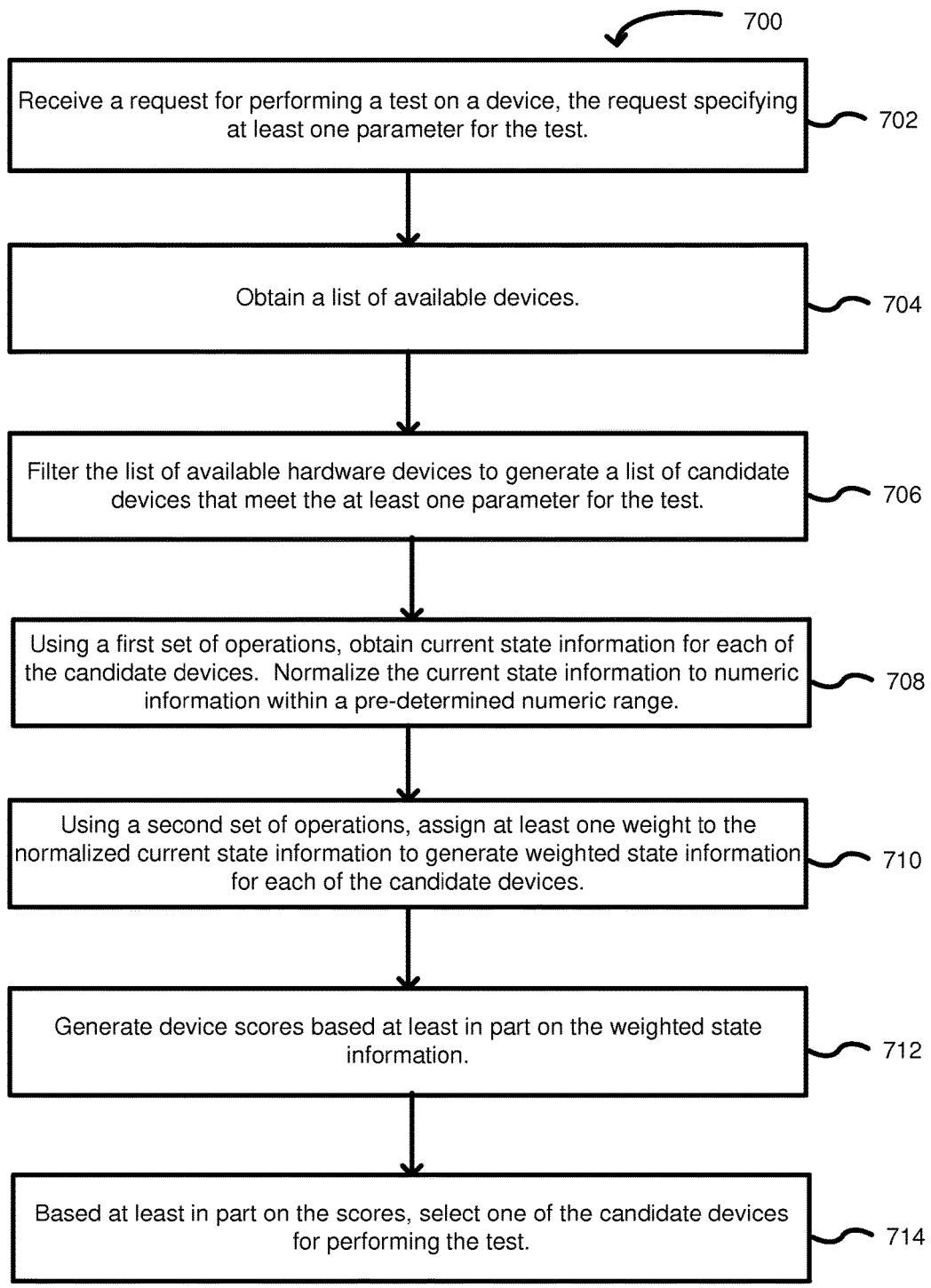
FIGS. 7-8 are flowcharts of example methods for implementing test scheduling in a compute service provider environment, in accordance with an embodiment of the disclosure.
Figure 8:
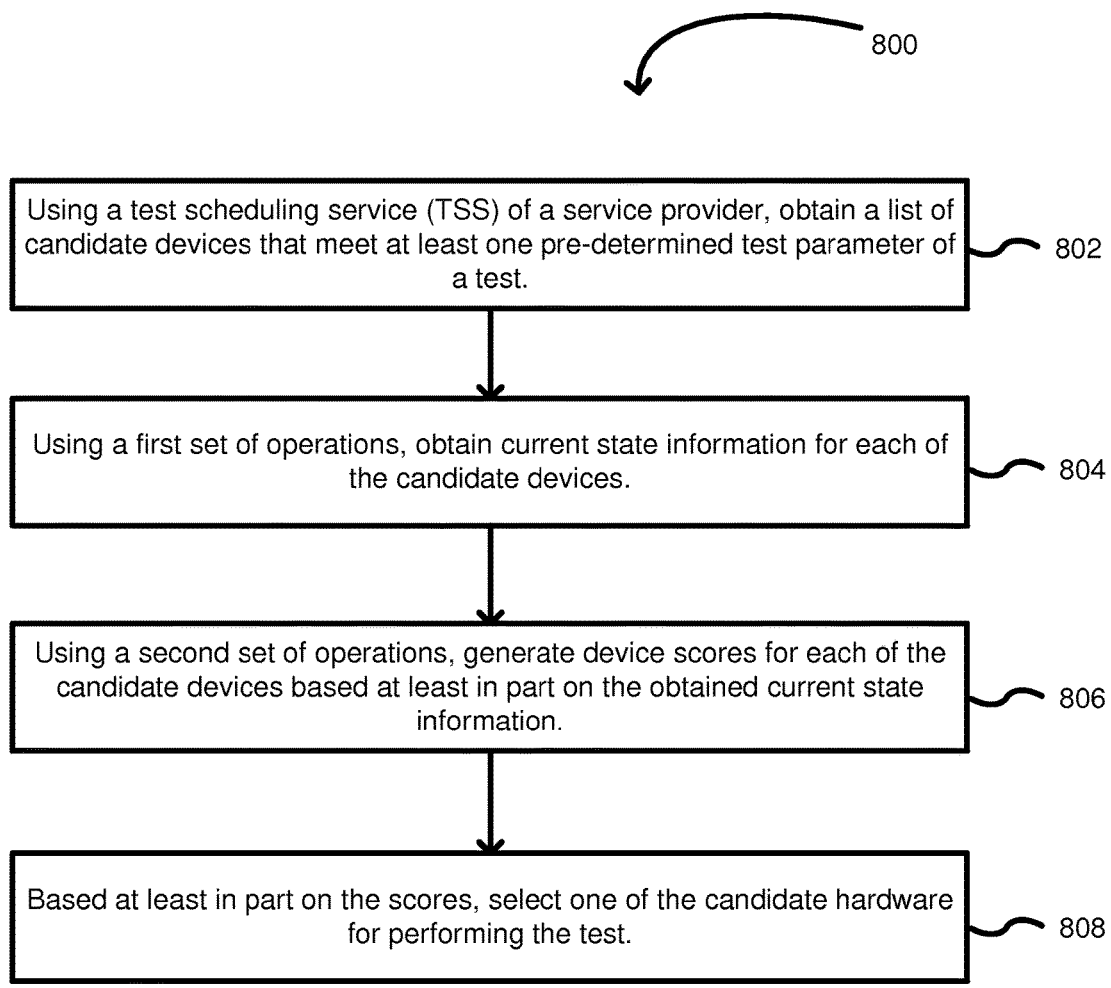

FIGS. 7-8 are flowcharts of example methods for implementing test scheduling in a compute service provider environment, in accordance with an embodiment of the disclosure. Referring to FIGS. 1-3 and 7, the example method 700 may start at 702, when a request for performing a test on a device (e.g., hardware and/or emulated devices running on virtual machine instances) may be received, the request specifying at least one parameter for the test. For example, an incoming test request 202 (with a device hash 203) may be sent from the test submission block 136 via the API 138. At 704, a list of available devices may be obtained. For example, the TSS 103 may receive the request and at 204, may query the database 112 for a list of available testing devices (e.g., specified by the testing device information 114). For example, the testing device information may return the available devices 214 serial numbers, e.g., 0123, 0567, 1234, 1567, and 1890. The testing device information 114 may further specify (for each of the five available devices 214), a device build (e.g., a user device for use by a user or an engineer device for use by a device engineer), an operating system revision number, device rooted status (i.e., whether the device is rooted or not), a device product code (i.e., a text string or code word identifying the device model), and device status (i.e., whether the device is idle, testing or offline).

At 706, the list of available devices may be filtered to generate a list of candidate devices that meet the at least one parameter for the test. For example, the input criteria (or device hash) 203 received with the test may specify that the test 136 is to be performed on a non-rooted device with a product code of "aston". Therefore, during the criteria screen 206, the TSS 103 may select devices with serial numbers 0123, 0567, and 1567 as a list 216 of candidate devices for making a final device selection.

At 708, using a first set of operations (e.g., 108), the TSS 103 may obtain current state information for each of the candidate devices. For example, the TSS 103 may determine maximum and minimum values for various types of state information, as illustrated in table 217*a* in FIG. 2. The current state information may then be normalized to numeric information within a pre-determined numeric range (e.g., a range of 0 to 9, as seen in FIG. 2). At 710, using a second set of operations (e.g., 110), the TSS 103 may assign at least one weight to the current state information to generate weighted state information for each of the candidate hardware devices. For example, the maximum and minimum values determined during performing the first set of operations, may be normalized and weighted using weighting table 118 (as seen in tables 217b-217c in FIG. 2). At 712, device scores may be generated based at least in part on the weighted state information. For example, the TSS 103 may generate device scores 217d (FIG. 2) for each of the candidate hardware devices, based on the weighting values and normalized values for each status information category (as seen in FIG. 2). At 714, the TSS 103 may generate a device selection 134 for one of the candidate devices, based at least in part on the device scores (i.e., select the highest-scoring device as the device to perform the received test 136).

Referring to FIGS. 1-3 and 8, the example method 800 may start at 802, when a list of candidate devices that meet at least one pre-determined test parameter of a test may be obtained using a test scheduling service (TSS) of a service provider. For example, the TSS 103 may receive the test 136 and device hash (e.g., 203), and may obtain a list of available hardware devices (e.g., 214). The list of available devices may be screened (or filtered) based on the device hash 203 to obtain the list of candidate hardware devices 216. At 804, the TSS 103 may obtain current state information for each of the candidate devices, using a first set of operations (e.g., 108). For example, the TSS 103 may obtain current state information for each of the candidate devices, and may determine maximum and minimum values for various types of state information, as illustrated in table 217a in FIG. 2. At 806, the TSS 103 may generate device scores for each of the candidate devices based at least in part on the obtained current state information, using a second set of operations (e.g., 110). For example, the TSS 103 may assign at least one weight to the current state information to generate weighted state information for each of the candidate devices. For example, the maximum and minimum values determined during the first set of operations, may be normalized and weighted using weighting table 118 (as seen in tables 217b and 217c in FIG. 2). Individual scores (e.g., 217d) may then be generated based on the assigned weights and the normalized values (e.g., the values in table 217c). At 808, the TSS 103 may select one of the candidate devices for performing the test, based at least in part on the generated scores. For example, the TSS 103 may generate a device selection 134 for one of the candidate devices, based on the device scores (i.e., select the highest-scoring device as the device to perform the received test 136).

FIG. 9 depicts a generalized example of a suitable computing environment in which the described innovations may be implemented. Referring to FIG. 9, the computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations (e.g., functionalities) described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A computer-readable storage medium including instructions that upon execution cause a computer system to:
   receive a request for performing a test on a device, the request specifying at least one parameter for the test;
   obtain a list of available devices;
   filter the list of available devices to generate a list of candidate devices that meet the at least one parameter for the test;
   obtain current state information for each of the candidate devices;
   normalize the current state information so that minimum and maximum values are mapped within a numeric range;
   assign at least one weight to the normalized current state information to generate normalized weighted state information for each of the candidate devices;
   generate device scores based at least in part on the normalized weighted state information; and
   based at least in part on the scores, select one of the candidate devices for performing the test.

2. The computer-readable storage medium according to claim 1, wherein the instructions, upon execution further cause the computer system to:
   assign each of the candidate devices to a separate test activity queue.

3. The computer-readable storage medium according to claim 2, wherein the instructions, upon execution further cause the computer system to:
   forward the test to an activity queue assigned to the selected one of the candidate devices.

4. The computer-readable storage medium according to claim 1, wherein the at least one weight comprises a weight value for each of a plurality of criteria associated with the current state information.

5. The computer-readable storage medium according to claim 4, wherein each of the plurality of criteria associated with the current state information for a selected device comprises:
   device status information;
   a number of pending tasks;
   a number of idle devices with one or more characteristic that is common with a corresponding characteristic of the selected device;
   a total number of devices with the one or more characteristic that is common with the corresponding characteristic of the selected device; and
   a last executed test time.

6. A method for selecting test devices in a service provider environment, the method comprising:
   using a test scheduling service (TSS) of a service provider:
   obtaining a list of candidate devices that meet at least one pre-determined test parameter of a test;
   using a first set of operations, obtain current state information for each of the candidate devices and normalize the current state information so that minimum or maximum values are mapped to numeric values;
   using a second set of operations, generate device scores for each of the candidate devices based at least in part on applying a weighting to the normalized current state information; and
   based at least in part on the device scores, select one of the candidate devices for performing the test.

7. The method according to claim 6, further comprising:
   receiving a request for performing the test on at least one of a plurality of available devices.

8. The method according to claim 7, further comprising:
filtering the plurality of available devices to generate the list of candidate devices, the filtering based on at least one input criteria.

9. The method according to claim 8, wherein the at least one input criteria comprises device build type, device battery life, device operating system revision number, device rooted state, device product code, device operating status, and/or time of last conducted device test.

10. The method according to claim 6, wherein the current state information for a selected one of the candidate devices comprises:
device status information;
a number of pending tasks for the selected device;
a number of idle devices with one or more characteristic that is common with a corresponding characteristic of the selected device;
a total number of devices with the one or more characteristic that is common with the corresponding characteristic of the selected device; and
a last executed test time.

11. The method according to claim 6, further comprising:
during the first set of operations, assigning numeric values to the current state information for each of the candidate devices.

12. The method according to claim 11, further comprising:
during the second set of operations, normalizing the assigned numeric values to fit within a pre-determined numeric range.

13. The method according to claim 12, further comprising:
retrieving at least one weight from a look-up table, the at least one weight associated with the current state information.

14. The method according to claim 13, further comprising:
assign the at least one weight to the normalized numeric values to generate the device scores.

15. The method according to claim 6, further comprising:
identifying an activity queue assigned to the selected one of the candidate devices.

16. The method according to claim 15, further comprising:
queuing the test in the activity queue for execution at the selected one of the candidate devices.

17. A system for selecting test devices in a service provider environment, the system comprising:
a plurality of test devices attached to at least one of a plurality of server computers, the plurality of server computers coupled together through a network to form the service provider;
a queuing server coupled to the plurality of server computers; and
a test scheduling service coupled to the queuing server, the test scheduling service operable to:
generate a list of candidate devices from the plurality of test devices, the candidate devices meeting at least one pre-determined test parameter of a test;
obtain current state information for each of the candidate devices, the state information including a number of pending tasks;
generate device scores for each of the candidate devices based at least in part on the obtained current state information including the number of pending tasks;
based at least in part on the scores, select one of the candidate devices for performing the test; and
communicating via the queuing server, the test to the selected one of the candidate devices for execution.

18. The system according to claim 17, wherein the queuing server is operable to queue the test to an activity queue associated with the candidate device.

19. The system according to claim 17, wherein the test scheduling service is further operable to:
receive a request for performing the test on at least one of the plurality of test devices.

20. The system according to claim 19, wherein the test scheduling service is further operable to:
filter the plurality of test hardware devices to generate the list of candidate devices, the filtering based on at least one input criteria.

* * * * *